L. H. Moseley,
Cutting Dye Wood.
N°242. Patented June 22, 1837.
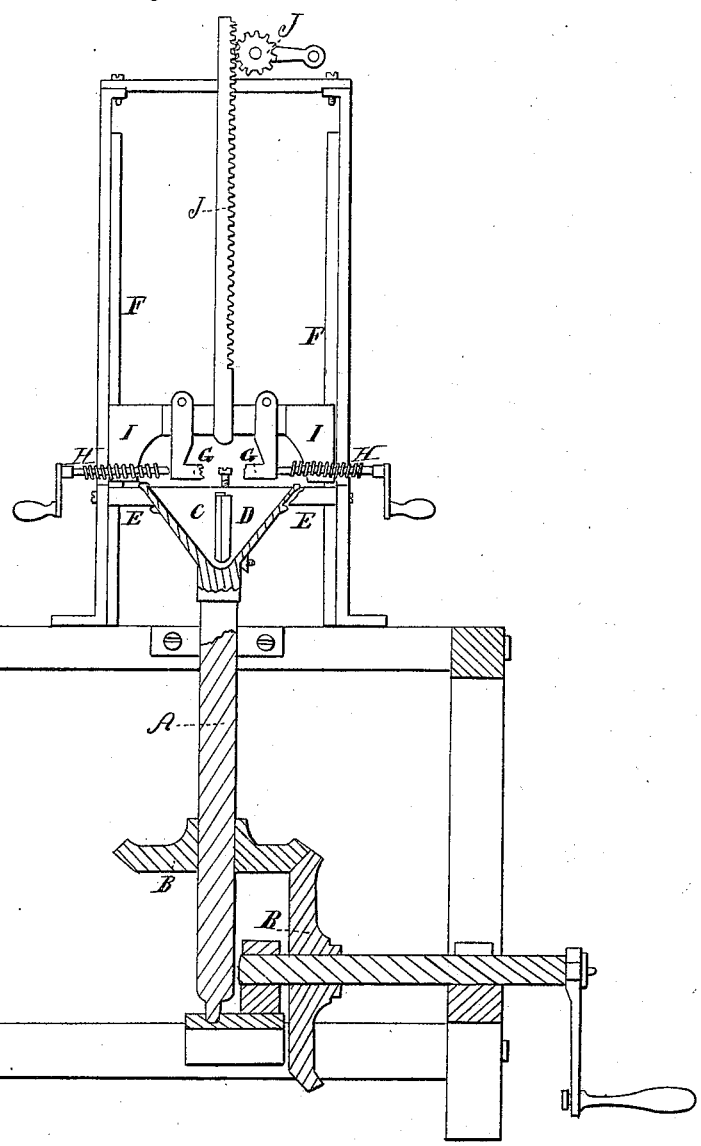

UNITED STATES PATENT OFFICE.

L. H. MOSELEY, OF POUGHKEEPSIE, NEW YORK.

MACHINE FOR CUTTING DYE-WOODS.

Specification of Letters Patent No. 242, dated June 22, 1837.

*To all whom it may concern:*

Be it known that I, LUCILIUS H. MOSELEY, of Poughkeepsie, in the county of Dutchess and State of New York, have invented an Improvement in Machines for Cutting Dye-Woods, and that the following is a full and exact description thereof.

Figure 1, in the accompanying drawing, is a section of the machine through the principal working parts thereof. A, is a vertical shaft, which may be made to revolve by means of the bevel gear B, B, or in any other convenient way. On the upper end of this shaft there is affixed a cup C, in the form of an inverted cone, which may be made of cast iron, and is to carry one, or more, knives, or cutters, D, which extend up from the center of the cup nearly to its upper edge. The revolving cup runs freely within a rim, or collar, E, E, attached to the vertical standards F, F. This rim may be even with the floor, or raised above it, as may be preferred. The wood to be cut may be gripped between the jaws G, G, by means of the screws H, H, passing through the slide I, working in guide grooves in the standards F, F, which have slots through them to allow the screw shanks to pass up and down. J, J, are a rack and pinion by which the slide may be raised when a piece of wood is to be placed between the jaws. The slide, with the wood to be cut, descends by its own gravity.

When smaller pieces of wood are to be cut than can be held by the jaws, the slide is raised, and a division, or check piece, Fig. 2, having two, or more, arms, K, K, is fastened in any convenient way to the rim, or collar, E, E. From the under side of these arms partition plates descend so as to come nearly into contact with the cup, thus dividing it into two, three, or more, cells, into which the pieces to be cut are thrown. Instead of the jaws to hold the log, or stuff to be cut, it may be placed in a tube, or trough, its tendency to revolve being checked in any effectual way; and in this case it may be found convenient to place the machine in an inclined, instead of a vertical, position.

What I claim as new in the above described machine is—

1. The employment of a hollow, conical cup, to carry the cutters in the manner herein set forth.

2. The using in such a cup, a check, or division piece, by which cells are formed into which the smaller pieces of stuff to be cut may be thrown for that purpose. The cup, instead of being conical, may have its sides more or less curved, but the conical form being deemed the best, I have spoken of it only, although I, of course, intend to include in my claims any form, or mode of operation, which is substantially the same with that described.

LUCILIUS H. MOSELEY.

Witnesses:
THOS. P. JONES,
ERASTUS TRACY.